United States Patent
Morales

(10) Patent No.: US 7,850,159 B2
(45) Date of Patent: Dec. 14, 2010

(54) METHOD OF PROCESSING AND PRINTING PRINT JOB PORTIONS FOR ENABLING BINDERY EFFICIENCIES

(75) Inventor: Javier A. Morales, Irondequoit, NY (US)

(73) Assignee: Xerox Corporation, Norwalk, CT (US)

( * ) Notice: Subject to any disclaimer, the term of this patent is extended or adjusted under 35 U.S.C. 154(b) by 882 days.

(21) Appl. No.: 11/796,932

(22) Filed: Apr. 30, 2007

(65) Prior Publication Data
US 2008/0264285 A1    Oct. 30, 2008

(51) Int. Cl.
*B65H 37/04* (2006.01)
(52) U.S. Cl. ............... 270/58.09; 270/1.01; 270/58.07
(58) Field of Classification Search ........... 270/1.01, 270/58.01, 52.01, 58.07, 58.09; 399/204, 399/407, 408, 410
See application file for complete search history.

(56) References Cited

U.S. PATENT DOCUMENTS

| | | | |
|---|---|---|---|
| 6,462,756 B1 | 10/2002 | Hansen et al. | |
| 6,615,105 B2 * | 9/2003 | Masotta | 700/219 |
| 7,092,936 B1 | 8/2006 | Alonso et al. | |
| 2003/0083778 A1 * | 5/2003 | Masotta | 700/219 |

* cited by examiner

*Primary Examiner*—Leslie A Nicholson, III
(74) *Attorney, Agent, or Firm*—Kermit D. Lopez; Luis M. Ortiz; Kevin L. Soules

(57) ABSTRACT

A method is provided for preparing one or more print jobs for finishing. The method includes dividing a portion of the one or more print jobs into a first set of pages corresponding with a first print output stack having one stack height and a second set of pages corresponding with a second print output stack having another stack height. A printing instruction is provided for causing at least one of the first and second sets of pages to be printed in a multiple up format when either one of the output stack heights is greater than a selected output stack height, or when the sum of the stack heights is greater than the selected output stack height. The printing instruction is used, pursuant to printing the first and second sets of pages with the printing instruction, for (1) causing the at least one of the first print output stack and the second print output stack to be printed in multiple-up format, and (2) preventing either one of the print output stack heights from exceeding the selected output height.

7 Claims, 5 Drawing Sheets

METHOD OF PROCESSING AND PRINTING PRINT JOB PORTIONS FOR ENABLING BINDERY EFFICIENCIES

CROSS-REFERENCE TO RELATED APPLICATION

Cross-reference is made to U.S. patent application Ser. No. 11/796,954 that was filed on the same day as the present application by the same inventors and assignee with the same title.

BACKGROUND AND SUMMARY

The disclosed embodiments relate generally to a method for processing and printing print job portions and, more particularly, to an approach in which one or more print output stacks are printed in multiple-up format responsive to an output related attributes, such as an output related attribute for at least one offline finishing device.

Creation and production of printed documents often involves many production and finishing operations that are highly variable with each job. In general, the various operations can be grouped into three major phases: 1) creation of the document information, including prepress operations that render the document in a form suitable for printing, 2) printing of the information onto some form of media such as paper, and 3) finishing of the selected media into a completed document. These 3 major phases often have many sub-phases, and the entire process may vary from relatively simple to extremely complex.

U.S. Pat. No. 6,462,756 B1 to Hansen et al. discloses a system and method for managing production printing workflow. The system includes workflow management software for managing and facilitating the procedural stages of the workflow including job origination, job preparation, job submission and job fulfillment. The workflow management software provides an integrated object oriented interface which visually reflects and interacts with the workflow. The software further provides functionality for efficient page level modifications to documents at the job preparation stage. This functionality allows such modifications to be easily made to selected pages and visually verified by displaying visual representations of the modifications on visual representations of the pages.

U.S. Pat. No. 7,092,963 B2 to Ryan et al. discloses a print production and finishing system for electronic management and control of a wide range of finishing processes characterized by input from multiple production operations and equipment that, depending upon the job, might be variably applied to work pieces that themselves are highly variable between different jobs. The disclosed embodiments of the '963 patent are applicable to many operations where processes for production of work pieces are managed separately from processes for finishing and packaging of such work pieces.

The pertinent portions of all of the above-mentioned patents are incorporated herein by reference.

Traditionally, when a document is composed, the person doing the composition will create one or more electronic image files that represent the parts of the document to be produced. These electronic image data files may be stored in many different formats by many different document creation and manipulation programs. For instance, for a complex document such as a book that utilizes color printing for book covers and pictorial inserts, any of a variety of Page Description Languages (PDLs), such as Postscript® and Postscript-compatible languages, may be used to render the color images in printable form. Often different components within a document will utilize different PDLs. For instance, the cover may be created by a different work team or upon different equipment than photographic reprints or other internal color components. Each prepress team or prepress device may utilize a PDL optimized for its use. For pages comprised of simple monochrome text, desk-top publishing programs may be utilized to render such pages or a simpler word processing language may be utilized. Still other prepress formats may be utilized for printing of inserts, dividers, and other possible components internal to the finished document. There also may be included in the assembly/finishing job non-printed components such as, without limitation, plastic separators, previously printed sheets retrieved from inventory, photographically produced sheets, or specialized media such as vinyl disk holders or perfume sample packs.

Workflows of the type described in the U.S. Pat. No. 6,462,756 are typically well suited for handling normal sized jobs of definite length, but not necessarily jobs of "indefinite length." Indefinite length jobs are jobs so large that no component in the workflow is generally capable of handling the entire job. An example of an indefinite length job is a variable data job that can run into the tens or even hundreds of thousands of individual variable information ("VI") records. An indefinite length VI can be challenging to execute because oftentimes the original input PDL VI record order must be maintained from PDL generation, through production to shipping.

The challenge associated with executing an indefinite length job can be further compounded when it becomes necessary to use imposition. In one approach, an indefinite length job is imposed in what is referred to as cut & stack, cut & marry, z-sort, or zip sort imposition. This imposition flows the original document pages vertically though a printed stack one multi-up position at a time. This permits the printed stack to be cut into multiple stacks that can then be combined to recreate the original document. Cut & stack imposition finds use in the printing of credit card statements where the statements of many customers may be printed together as one large job.

Execution of indefinite length jobs can become particularly problematic when the printed stack is larger than the output capacity of the stacker, as is often the case when printing an indefinite length job. For those instances in which the original document pages flow vertically through the entire printed stack, the document cannot be finished until all pages of the imposed document are printed. Execution of certain indefinite length jobs (e.g. a 500,000 page credit card statement run), can result in document stacks that cannot realistically be sent to a bindery for finishing.

To alleviate the problem resulting from oversized document stacks, imposition applications may set a "stack depth" parameter that sets a maximum number of sheets through which contiguous input document pages may be vertically flowed. Smaller stacks containing a contiguous portion of the original input document result so that a cut & stack process can be employed without waiting for the entire job to finish printing. Although this enhancement of setting stack height can mean the difference between imposing or not imposing a given indefinite length job, it still does not necessarily result in efficient finishing of infinite length jobs.

It would be desirable to provide an enhancement for handling infinite length jobs in such a way as to enable better parallelism in finishing the resulting output. In particular, such enhancement might include evaluating constraints from business rules and finishing devices to determine an optimal approach for flowing a document though imposition so that portions of the infinite length job could be processed in a variety of finishing operations without losing confidence in the ability to reconstitute the original input document.

In accordance with a first aspect of the disclosed embodiments there is disclosed a method of preparing one or more print jobs for finishing, comprising: (A) providing an output related attribute for at least one offline finishing device, the output related attribute of the at least one offline finishing device corresponding with a first print output stack height; (B) dividing a portion of the one or more print jobs into a first set of pages with each page of the first set of pages being in a single-up format and a second set of pages with each page of the second set of pages being in the single-up format, wherein the first set of pages corresponds with a first print output stack having a second stack height and the second set of pages corresponds with a second print output stack having a third stack height; (C) providing a printing instruction for causing at least one of the first and second sets of pages to be printed in a multiple up format when either one of the second print output stack height and the third print output stack height is greater than the first print output stack height or the sum of the second print output stack height and the third print output stack height is greater than the first print output stack height; and (D) printing the first and second sets of pages with the printing instruction, wherein, (1) during said printing, the at least one of the first print output stack and the second print output stack is printed in multiple-up format, and (2) neither the second print output stack height nor the third print output stack height is greater than the first print output stack height.

In accordance with a second aspect of the disclosed embodiments there is disclosed a method of preparing one or more print jobs for finishing, comprising: (A) obtaining an output related attribute corresponding with a first print output stack height; (B) dividing a portion of the one or more print jobs into a first set of information and a second set of information, the first set of information corresponding with a first set of pages having a second print output stack height and the second set of information corresponding with a second set of pages having a third print output stack height, wherein each page of both the first set of pages and the second set of pages is in a single-up format; (C) providing a printing instruction for causing at least one of the first and second sets of pages to be printed in a multiple up format when either one of the second print output stack height and the third print output stack height is greater than the first print output stack height or the sum of the second print output stack height and the third print output stack height is greater than the first print output stack height; and (D) printing the first and second sets of pages with the printing instruction, wherein, (1) during said printing, the at least one of the first print output stack and the second print output stack is printed in multiple-up format, and (2) neither the second print output stack height nor the third print output stack height is greater than the first print output stack height.

DESCRIPTION OF DISCLOSED EMBODIMENTS

Figure 1:
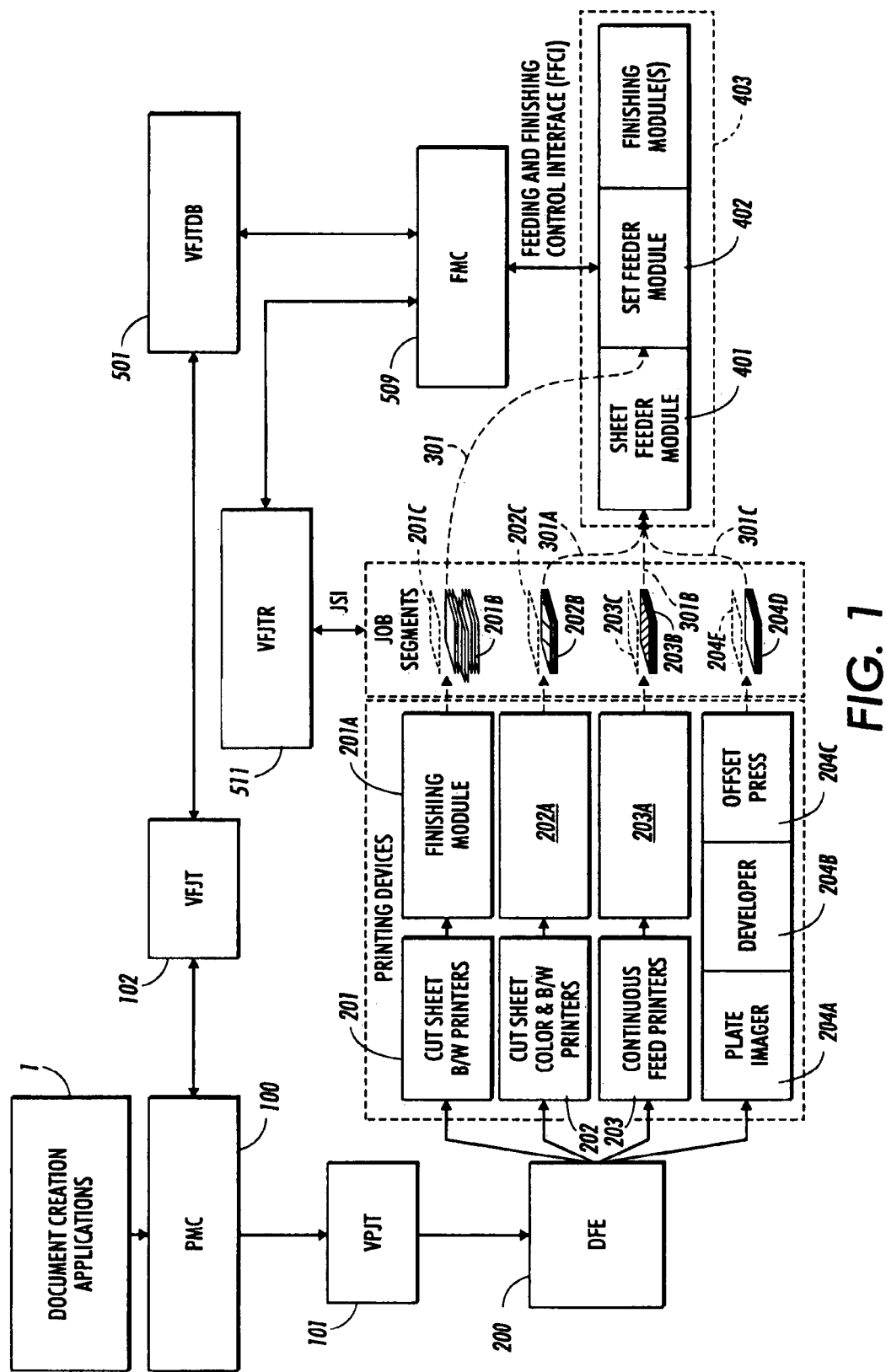
FIG. 1 is a block diagram of a document processing workflow including a production monitor controller (PMC), the workflow being suitably configured for use with the disclosed embodiments.

Turning now to FIG. 1, an overview of a workflow suitable for use with disclosed embodiments is shown. Within FIG. 1, box 1 represents prepress operations, and the output of the prepress operations of box 1 is a set of appropriate PDL files that are delivered to a Production Monitor Controller (PMC), 100. As described more fully below, the PMC is a controller that coordinates overall production of the print job.

Figure 2:
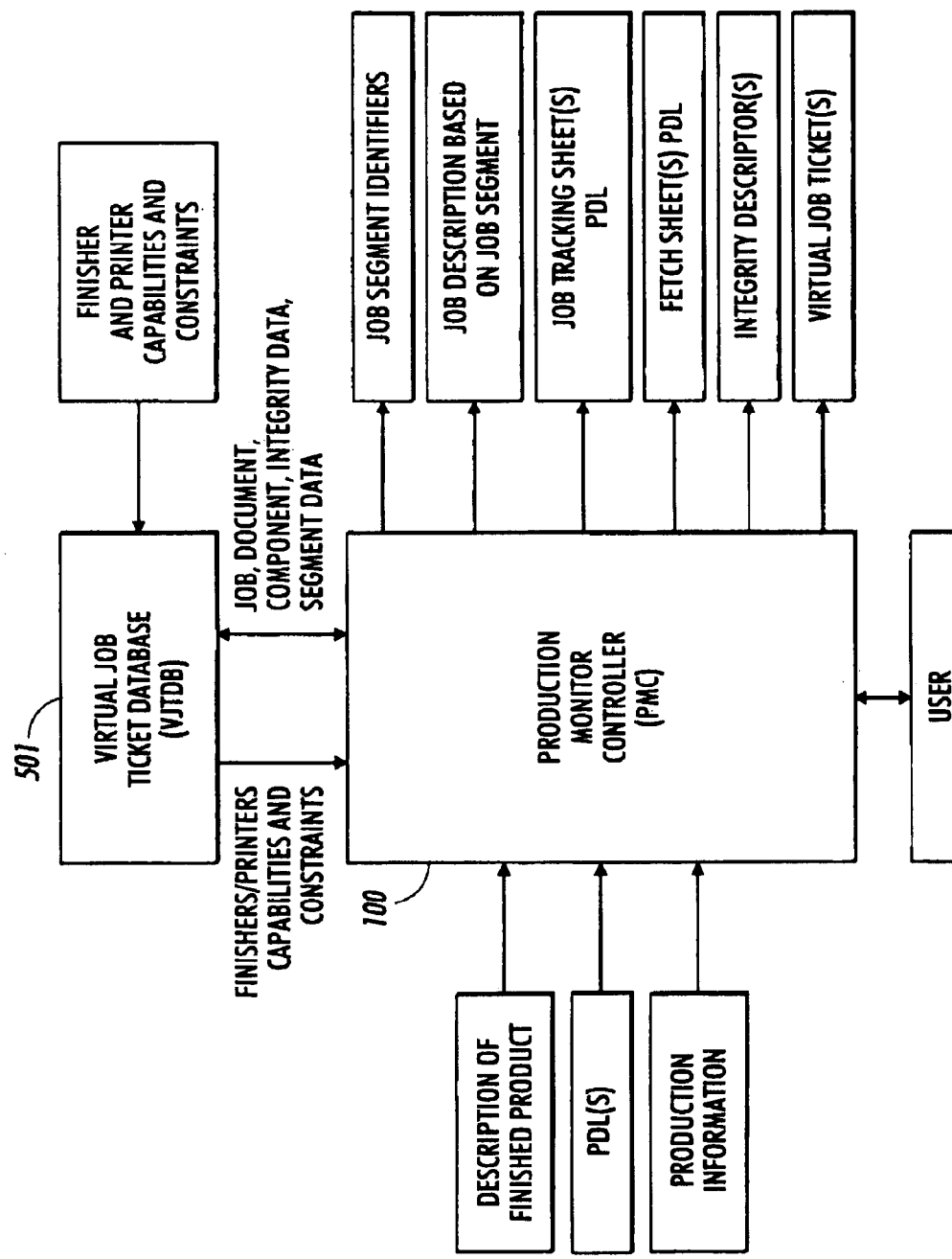
FIG. 2 is a block diagram emphasizing selected aspects of the workflow of FIG. 1, including the PMC with various inputs and outputs, such as a virtual job ticket database (VJTDB)

FIG. 2 shows some exemplary inputs and outputs of the PMC 100, as well as the relationship between the PMC and a virtual finishing job ticket database (VFJTDB) 501. In general, the inputs to the PMC 100 include some or all of: 1) from the Virtual Printer Job Ticket Database ("VPJTDB"), a list of printer capabilities and constraints; 2) from the VFJTDB, a list of assembler/finisher capabilities and constraints; 3) a description of the finished product which may be a CIP3 or similar description; 4) PDLs and other files for the content to of each sheet to be printed; 5) production information such as the number of copies, targeted printing devices, and any special finishing or packaging attributes, including, without limitation, the identity and retrieval location of any non-printed and/or inventory items. In general, the output from the PMC includes identification of each job segment for each operation within the job as well as a set printing and assembling/finishing instructions for each job segment. More specifically, the output from a PMC comprises some or all of: 1) a job segment descriptions and identifiers for each job segment; 2) a database representation (such as the VJTDB description explained below) of the structure of the job segments and the document components, sheets or sets within the job segment; 3) a PDL file for a job tracking sheet, if any; 4) a PDL for a fetch sheet, if any; 5) integrity descriptors encoded into the VFJTDB for later use by a Finishing Module Coordinator (FMC); 6) virtual job tickets for printers and Assembler/finishers; and 7) a prompt to call for one or more human operator responses.

Referring again to FIG. 1, the instruction set for printing and Phase 3 assembling/finishing is output from PMC 100 in the form of both a Virtual Print Job Ticket (VPJT), 101, and a Virtual Finishing Job Ticket (VFJT), 102. The VFJT and VPJT may contain the complete instruction set for the job or may simply contain reference pointers to a database where such information is retained. The VPJT 101 is conventional in the art as discussed in relation to U.S. Pat. No. 5,995,721 to Rourke et al., U.S. Pat. No. 5,615,015 to Krist et al., and U.S. Pat. No. 5,760,775 issued to Sklot.

The data for each VFJT is recorded by the PMC in the VFJTDB shown in FIG. 1 as 501. In one example, the VFJTDB is a database or a data file that contains all job construction, control and integrity data necessary to take the prints coming from the printing device(s) and perform the necessary finishing processes to turn the prints into the desired final output form. The format of the VFJTDB can be hard copy (print), soft copy (floppy, CD-R, CR-RW) or electronic (electronically stored in memory or on a hard disk drive) copy form. The format may be one or both of human and machine-readable.

The type of data and instructions required in a VFJTDB 501 for each job are information such as but not limited to: accounting and administration information, sheet, set and job level finishing instructions, color and print quality control data, registration data, etc. The data and instructions also contain a description of the job segments (stacks and stacks of sets) of the job being produced and instructions on how to reassemble these pieces to complete the processing of the job. Additionally this information can enable the automatic setup of the finishing device(s), integrity control and monitoring throughout the full scope of the production processes. The VFTDB provides the basis for a direct link between the offline finishing operations and the integrity control functions of online printing and intermediate finishing systems. The VFJTDB data can take on the form of a proprietary format or an industry standard format such as but not limited to a modified form of CIP3.

Referring still to FIG. 1, the printing process may be commenced after delivery of the VPJT, 101, to one or more Digital Front End Print Controllers (DFE) represented by box 200. Such DFE's are conventional in the art. Examples include PDL products made by Splash, Harlequin, Adobe, and others. In conformance with instructions provided in the VPJT, 101, the print job is divided into separate printing job segments and is distributed to various print engines for printing using the printer or press which the operator or PMC, 100, believed to be optimal when the VPJT was first established. Alternatively, the VPJT may provide that the DFE, 200, sometimes through interaction with the PMC, 100, may automatically select the appropriate printing device based upon dynamic queue and print selection criteria.

Boxes 201-204 of FIG. 1 are examples of various types of printers to which document components may be delivered for printing. Printer 201 may be a cut sheet digital printer connected to an integrated finishing module 201A. Integration between printer 201 and finisher module 201A is accomplished using DAF or MFA-type protocols. As discussed above, a typical finisher module 201A includes capabilities such as collation, folding, and simple binding such as stapling. Printer 202 may be a cut sheet printer with a combination of color and monochrome printing capability. The Document Centre® Color Series 50 printer sold by Xerox Corporation is such a printer. Finisher module 202A is integrated with printer 202 as shown in FIG. 1 and may have capabilities similar to those described in connection with finisher 201A. Similarly, printer 203 is shown as a continuous form feed printer and is integrated with finisher module 203A. Printer 204 represents the various apparatus and processes normally associated with offset printing, including the prepress steps of preparing offset plates at a plate imager 204A, plate developer processor 204B, and offset printing press 204C. Unlike printers 201-203, which may be digitally integrated with their respective intermediate finishing modules 201A-203A, offset presses are not digital imaging devices and lack direct digital integration with assembly and finishing equipment.

As shown in FIG. 1, each of finishing modules 201A-203A and offset press 204C place their respective job segments in their respective output trays or bins 201B-203B and 204D. When placed in such trays or bins, the job segments or may not be collated, stacked or otherwise separated for handling and conveyance. Also each of finishing modules 201A-203A may provide some intermediate level of finishing, such as folding or stapling. Multiple document components may be printed or assembled at the same printer and intermediate finishing station and be treated during this phase of the job as one job segment. Conversely, a single large document component may be output in a stack with separator sheets or offset stacks indicating multiple job segments within the single document component.

Figure 3:
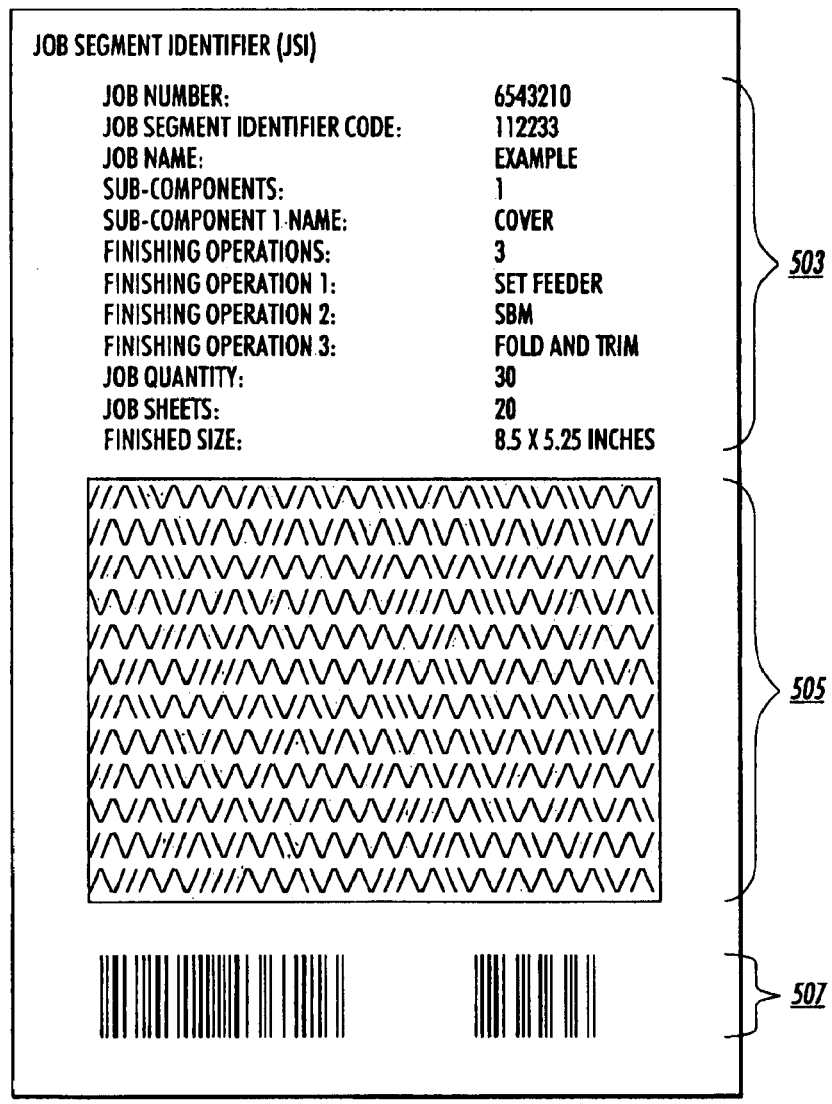
FIG. 3 is a planar view of a job segment identifier sheet.

Referring to FIGS. 1 and 3, another aspect of the disclosed embodiments is the association of a unique Job Segment Identifier (JSI) with each job segment. In FIG. 1, a sheet containing a JSI is shown in association with each job segment that is output from printers 201-204. The respective JSI sheets are labeled 201C-203C and 204E, respectively. For complex jobs or for document components that are printed in large stacks, there may be many JSIs corresponding to many job segments within the job or within the stacks.

A JSI can assume any form that can be associated with a job segment throughout the finishing and other applicable printing processes. Among such forms are copies stored in (a) a printed sheet printed and placed on top of a printed job segment, (b) system memory such as hard drives, (c) magnetic media such as floppy disks or magnetic strips, (d) optical memory such as CD-ROM or CR-RW disks, (e) bar code symbols printed on sheets associated with the Job Segment, or (f) any other means by which machine or human readable identifying information may be associated with a Job Segment. A JSI may be machine, human readable, or both depending upon the phase of the job. Indeed, in the event that a scanner is capable of reading the top printed page of a job segment in such manner that the job segment can be uniquely identified, then no special symbols or special top page would be necessary. Thus, each JSI contains, as a minimum, a job and job segment number or other identifier that uniquely identifies the job segment from all other job segments. Typically, the JSI comprises both a unique job number and a Job Segment Identifier Code (JSIC). The job number uniquely identifies the print job from all other print jobs and the JSIC uniquely identifies the job segment. In one embodiment, the JSIC comprises recognizable unique text on the top sheet of a job segment, which JSIC forms a vector to a JSI that remains encoded in digital memory. Whichever form a JSI takes, the JSI serves as a reference pointer to the portion of the VFJTDB that Describes the contents of the identified job segment. The JSI remains associated with the applicable job segment when it is transported from the printing device(s) to other finishing processes. This enables tracking of the job segment from the printing device(s) to the assembler/finisher apparatus. Whether or not the job segments are part of a job that requires prints to be produced on one or more printing device(s), each JSI will have a common job number but a different JSIC that uniquely identifies each particular job segment of the job.

In FIG. 1, the JSIs are shown in the form of a printed sheet called a Job Segment Identifier Sheet (JSIS) that is typically printed along with the sheets of the job and is placed on top of the job segment stack in the output trays or bins, 201B-203B and 204D. Such JSIS sheets are shown in FIG. 1 as 201C-203C and 204E. Information on a JSIS comprises either (a) a pointer (the job number and JSIC) to VFJTDB stored in some other electronic or soft copy format or (b) the portion of the VFJTDB itself that provides instructions for the job. Such instructions may be printed on the JSIS in electronic or human readable form. In contrast to conventional separator sheets that are placed upon each stack of printed output no matter how large the stack, each JSIS serves as a unique identifier of each job segment of a print job.

Referring to FIG. 3, an example of a JSIS is shown. Human readable text comprising the JSI and job instructions is shown at region 503. In region 505, machine readable glyphs are shown containing the full data content of the VFJTDB applicable to the identified job segment. In region 507, a machine readable bar code is shown which comprises a pointer to the VFJTDB stored elsewhere.

In the final assembly and finishing phase, the various document components are gathered from output trays or bins 201B-203B and 204D, assembled in a particular order, and finished into a specified document form. In FIG. 1. arrows 301 and 302A, B, and C show the conveyance of printed job segments from output trays or bins 201B-203B and 204D to finishing Set Feeder Module 402 and Sheet Feeder Module 401, respectively.

As contemplated by the disclosed embodiments, each job segment arrives at the assembler/finisher apparatus with a JSI reference pointer. As noted above, this typically will appear on a JSIS although any form of JSI will suffice. The purpose of the JSI is to identify a particular job segment to a Finishing Module Coordinator (FMC) 509, which is a controller suitable for directing the assembler/finisher operations. In FIG. 1, a Virtual Finishing Job Ticket Reader (VFJTR) is shown as 511 and is responsible for reading the JSIS or for otherwise providing information to the FMC, 509, sufficient for the FMC to determine the unique JSIC. Humans may also intervene in the process to submit JSICS to the FMC, particularly if a JSIS is only human readable. The FMC, 509, is a software-based controller that manages, interprets, sequences, and allocates assembler/finisher production data. Using a variety of interfaces to each assembler/finisher device, the FMC communicates to each device the data required to program that device for implementation of the job. It tracks each job segment through the process and ensures that job segments are properly loaded before the devices begin operating.

The FMC also typically provides information to human operators concerning job status and in order to enable operators to make production decisions where necessary or appropriate. The FMC operates by receiving the JSI that identifies each job segment and determining whether the JSI itself contains all required assembler/finisher data. If a JSIS or similar JSI does not provide all instructions for finishing the job, then the FMC uses the JSIC to retrieve all relevant information concerning the job model stored in the VFJTDB. The FMC then reviews the assembler/finisher combinations prepared by the PMC to ensure that all identified devices are currently available. Once this condition is satisfied, then the FMC determines the bins or other assembler/finishing locations where each job segment should be placed. In general, the FMC communicates with the PMC through the VFJTDB. Where assembler/finisher devices are automatically programmable, the FMC may be programmed to interact with the specified interface format for each device in order to automatically provide programming instructions. Job tracking and integrity information would also be provided. When all required job segments have been loaded in their appropriate bins, the FMC would either direct the assembler/finisher devices to begin or would inform human operators that the job is ready. In this manner, the complete assembler/finisher operation can be controlled, implemented, tracked, and checked for integrity.

Further detailed description regarding structure and operation associated with FIGS. 1-3 is provided in U.S. Pat. No. 7,092,963 B2 to Ryan et al., the pertinent portions of which are incorporated herein by reference.

Figure 4:
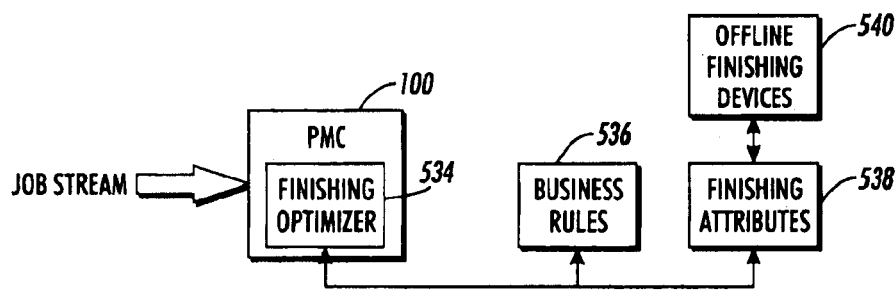
FIG. 4 is a block diagram illustrating an exemplary approach for communicating business rules and finishing attributes to a finishing optimizer application of the PMC.

Referring now to FIG. 4, portions of the combined arrangement of FIGS. 1 and 2 are broken out. The arrangement of FIG. 4 illustrates an exemplary approach in which the PMC 100 can be provided with finishing optimization software or application 534, the significance of which software will appear below. As contemplated, the software, labeled "FINISHING OPTIMIZER," communicates with modules respectively designated by the numerals 536 ("BUSINESS RULES") and 538 ("FINISHING ATTRIBUTES". As discussed in further detail below, business rules may include customer constraints. (e.g., the zip codes to which portions of a job are to be mailed or the box size in which each portion of a given job is to be inserted), while finishing attributes may include the stack height(s) of one or more types of offline finishing devices, such as a trimmer or a bundler. In one example, business rules are provided to the module 536 (by, for example, programming), while finishing attributes are communicated from offline finishing devices 540 to module 538.

Figure 5:
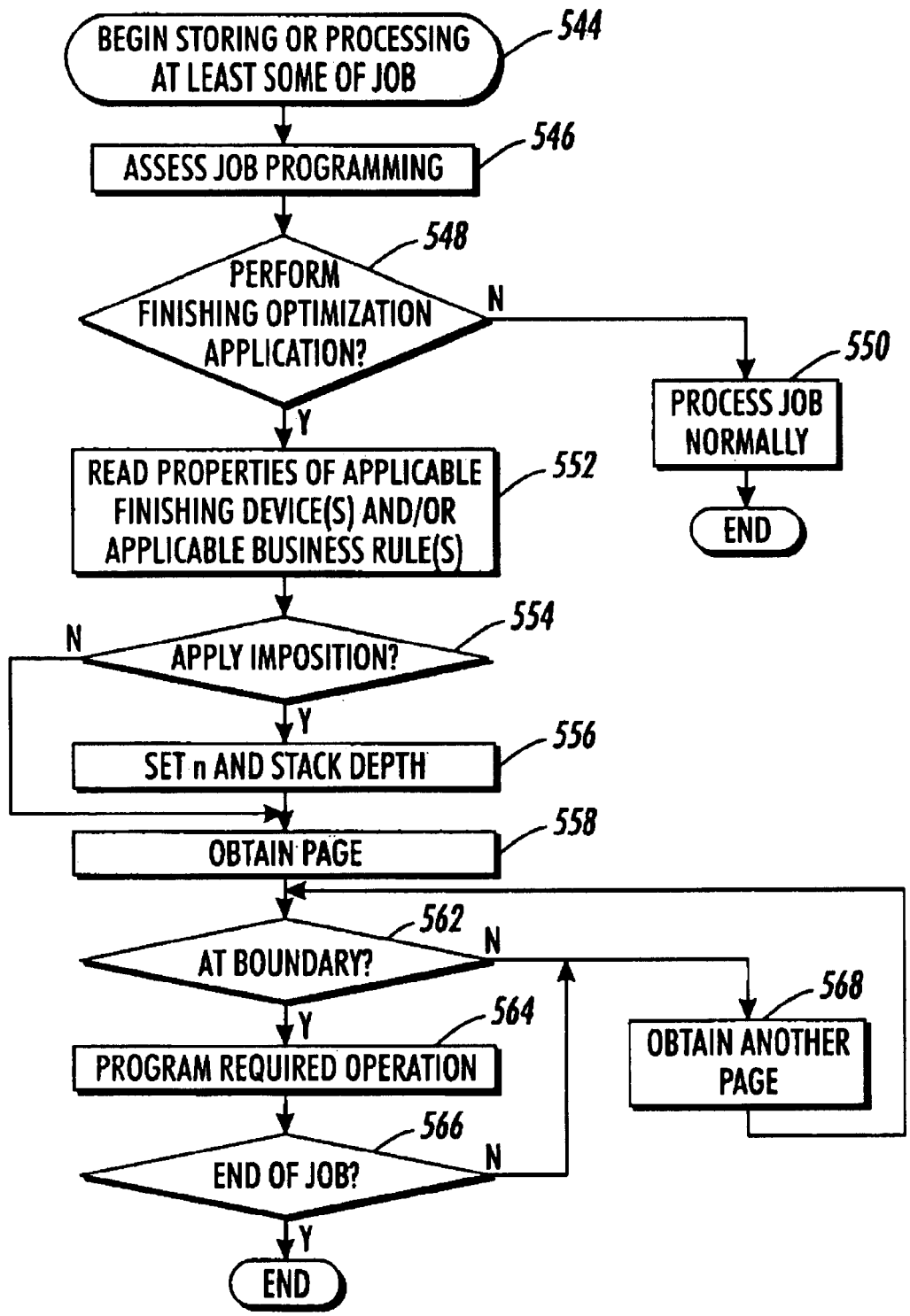
FIG. 5 is a flow diagram illustrating various functional aspects of the finishing optimizer application.

Referring to FIG. 5, a functional framework for the finishing optimizer application 534 is described. As will appear, functions of the finishing optimizer may include programming a given job type to include selected separations, and possibly setting up for subsequent imposition.

At 544 the storage or processing of at least a portion of a job is commenced. It should be appreciated that this commencing can occur concurrently with the processing or storing of another job. Consequently, the end of a job can be stored or processed while the beginning of another job is being stored or processed. Indeed, it is contemplated that the finishing optimization application can, in one situation, be operating on the end of a first job while beginning a second job. As will appear, under this situation the finishing optimization application could cause a separation to occur along a boundary between the end of the first job and the beginning of the second job.

For each new job, a job programming assessment is performed at 546. Pursuant to the assessment, a determination of job type may be made. Responsive to the determination, an inquiry is performed at 548 to determine if the finishing optimization application should be used with the job whose programming was just assessed ("current job"). If the current job is a normal job (e.g., job of normal length), then it is processed normally at 550. If, on the other hand, the current job is a job conducive to finishing optimization, such as an indefinite length job, then the process proceeds to 552. Referring specifically to 552, in conjunction with FIG. 4, the properties of one or more offline finishing devices and/or one or more business rules can, as necessary, be read.

Subsequently, the process determines, at 554, if imposition should be applied to the current job. Assuming that imposition is to be performed, then associated prepress operations, such as setting the number of images per side ("n") and stack depth are set at 556. Prepress operations of the types contemplated at 556 can be performed in accordance with teachings from U.S. Pat. No. 7,092,963 B2 to Ryan et al., U.S. Pat. No. 6,249,993 to Dreyer et al., and/or U.S. Pat. No. 7,163,269 to Levine et al., the pertinent portions of which are incorporated herein by reference.

After reading appropriate properties (at 552) and performing necessary prepress operations (at 556), a first electronic page of the current job is retrieved at 558. As each page is retrieved, a check is performed at 562 to detect the existence of a boundary. As should be appreciated, the existence of a boundary might be dictated by one of several factors. In one instance, boundaries might exist because of the limits of one or more finishing devices. For example, one set of boundaries might be set for use with a trimmer while another set of boundaries might be set for use with a bundler. In another instance, a job might include several boundaries responsive to a business rule. As described in detail below, for example, mailing codes might dictate how job boundaries should be set to accommodate for zip codes. Another example of boundaries set in accordance with a business rule might include parsing a job so that each output set fits into a given container size. In yet another instance, boundaries might exist between jobs or within a single job.

Referring still to FIG. 5, if a boundary is found at 562, then a program required operation is performed at 564. A program required operation might include, among other things, generating an instruction for either creating a slip sheet or performing an output related operation, such as offsetting two print output stacks relative to one another. After performing the program required operation, an end-of-job check is performed at 566. If, the end of the job has been reached, then the finishing optimization application is exited and further jobs are examined; otherwise, another page is obtained via 568. Over time, each boundary will be discovered, and appropriate corresponding program required operations will be performed until the end of the job is reached.

As mentioned above the disclosed embodiments facilitate the management of indefinite length jobs. Printing of very long indefinite length jobs, sometimes referred to as "infinite length jobs" is characterized by the printing of a job (or series of jobs) so large that no print production operation can exclusively handle the entirety of the job. Potentially all job operations from PDL creation to shipping could be taking place concurrently, and each operation should be executing work and passing it to the next operation without expectation of receiving the entirety of the overall job.

In one example the disclosed embodiments enhance imposition to facilitate concurrent bindery operations on an infinite length job. In order to facilitate production, cut & stack imposition may be used to divide an imposed document into contiguous sections based on a stack depth parameter. This parameter may be fixed to a single number. In order to facilitate finishing, stacker unload may be configured to match the cut & stack imposition stack depth parameter. For example a stacker with a capacity of approx 2500 sheets may be configured to unload every 2400 sheets. The cut & stack imposition can also be configured with a stack depth of 2400 sheets.

While this enables the imposition to work as expected, it can cause individual records (or jobs) to be split amongst multiple output stacks. Such splitting often requires reconstituting of records (or jobs) at post-cutting bindery operations. Furthermore, while this sort of splitting does enable concurrent printing and binding, it can lead to possible inefficiencies in post-printing operations, such as finishing. More particularly, if records are split amongst multiple stacks, the binder operator must track the split records to ensure that they are properly reconstituted. This is not only inefficient, but has the potential to cause errors.

The disclosed embodiments seek to enable post-printing operational efficiencies by using knowledge of the end-to-end print production environment and knowledge of the input document stream (in the case of VI documents) to dynamically adjust imposition parameters throughout the processing of the indefinite length job.

In one example, the disclosed embodiments contemplate the collection and use of several physical constraints for determining how to dynamically set a stack depth value, which is used for creating contiguous subsets of the overall jobs. The system disclosed herein might gather the following information:

Print engine stacker capacity for selected media—stacker capacity varies depending on paper thickness.

Trimmer capacity for selected media—trimmed capacity varies depending on paper thickness.

Feeding and binding capacity for finishers—e.g., if producing folded mailers: feeder capacities for scoring machine, folder, tabber and bundler.

This information should provide the system with boundaries to use when automatically determining the stack depth for a given job.

In one example, the following values and assumptions were employed:

Print engine stacker capacity is 1500 sheets for the selected media.

Trimmer capacity of 250 sheets for the selected media.

Scoring, folding and tabbing machine capacities are unlimited as the feeder can be replenished without stopping the machines (although this is not always the case, it helps to simplify the example).

Bundler capacity is 150 sheets for the selected media (this may be an USPS regulation rather than a true limitation)

Figure 6:
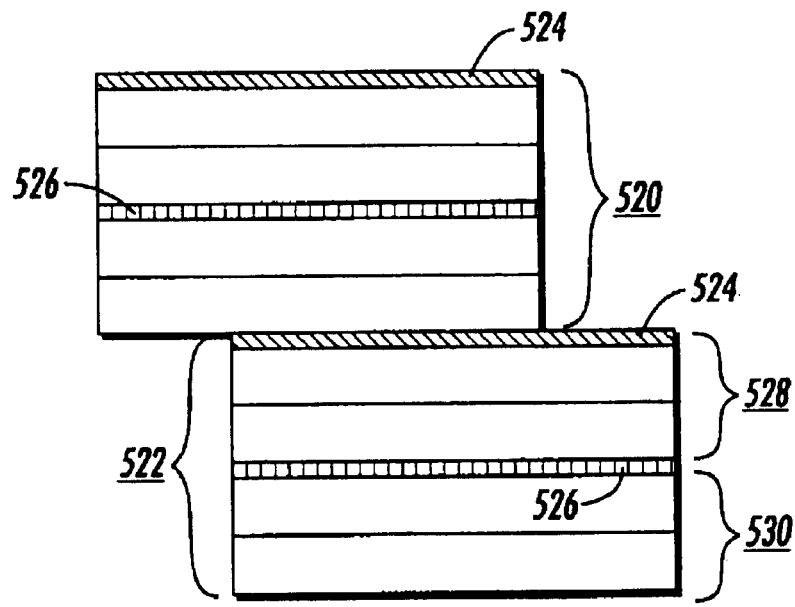
FIG. 6 is an elevational view of two print output stacks offset relative to one another, each of the print output stacks being associated with at least one print media sheet.

In the above example, for static jobs (not VI), the above information could be used to initialize the system for setting stack depth to 250 sheets. During printing, the system might impose the document so that every 250 sheets correspond with a contiguous section of the input document (since these sections are to be trimmed into discreet stacks). Referring to FIG. 6, the system can offset the stack at section boundaries to assist the trimmer operator in loading print output stacks into the trimmer. In FIG. 6, one section 520 (suitable for loading with a trimmer) is shown as being offset relative to a comparable second section 522. As will be appreciated by those skilled in the art, a given stack might be offset at many boundaries, with each offset section being suitable for loading with one of several different types of finishing devices.

The system is also capable of adding insert or slip sheets every 125 sheets to help the bundler operator differentiate the sections that should be fed into the bundler. The system would, for the one example mentioned above, still unload the stacker every 1500 pages and every stack would have 6 contiguous sections that could be trimmed independently of the preceding and following sections. Each of these sections would have insert sheets to differentiate the sheets that should be fed into the bundler immediately.

In accordance with the above example, the system identifies the boundaries required by the various hardware devices and performs a boundary differentiation operation per configuration. Referring again to FIG. 6, the system of the present one example might be configured to offset at trimmer boundaries and to insert sheets at bundle boundaries. In response to other capacity constraints, the system might be configured to differentiate certain additional boundaries by either selecting different media (e.g., blue inserts may be provided for bundler boundaries and yellow inserts for folder boundaries; or blue inserts for bundler boundaries with blue inserts and offset for folder boundaries). The system of the example keeps a consistent boundary demarcation for a specific bindery operation so that finishing operators have a consistent way to handle the printed media. As shown in FIG. 6, one type of insert sheet 524 separates sections 520 and 522, while another type of insert sheet 526 divides at least section 522 into two smaller sections 528 and 530. In one exemplary form of operation, the insert sheet 524 could be configured to facilitate performance of a first finishing operation on section 522, while the insert sheet 526 could be configured to facilitate the performance of a second type of finishing operation on section 530. Additionally, insert sheet 524 could also be configured to facilitate performance of the second type of finishing operation on section 528.

When handling variable jobs, such mailers (which generally include variable names and addresses), the disclosed embodiments provide an enhancement by evaluating input PDL data against a set of predefined rules (e.g., USPS Zip sorting rules) to determine whether providing additional boundaries would be useful. It is understood that USPS prefers mail piece bundles to be "Direct" (all pieces going to a specific 5-digit zip code), "Zip Center" (all pieces going to a 3 digit zip center), or "ADC" (all pieces going to the same Area Distribution Center). In this example, the bundler boundaries can be based on a combination of USPS rules and bundling finishing device capacity rules.

To further elaborate on the above example, it may be assumed that the PDL data contains 100 cards for zip 14621, 300 cards for zip 14622, 1500 cards for zip 14623 and 700 cards for zip 14644. Consistent with the example, the system could still set the stack depth to 250 sheets (since this is controlled by the trimmer capacity) and offset accordingly. However, this stack depth would, in the one example, serve as a maximum stack depth rather than a fixed value. Since the system would preferably keep USPS bundles together whenever possible, the exact placement of the offset depends on USPS bundle boundaries. Similarly, the insert sheets used to define a bundle would not necessarily be inserted at fixed intervals. Rather, the value for placement of these sheets would also serve as a maximum value that is dependent on keeping USPS bundles together.

Continuing with the example, the system might evaluate the input data and determine that that there are four discreet USPS bundles with 100 (zip 14621), 300 (zip 14622), 1500 (zip 14623) and 700 (zip 14624) cards each. These translate into 25 (zip 14621), 75 (zip 14622), 375 (zip 14623) and 175 (zip 14624) sheets if imposed 4-up. The system could then evaluate these sheet requirements against the trimming capacity (250 sheets) and split any bundle that is deemed too large. The splitting of these bundles is performed so that, as much as possible, bundles in the same offset stack add up to the trimmer capacity while splitting the bundle as little as possible. In this event, the zip 14623 bundle might be split into two bundles since it's less than two times the trimmer capacity (250×2).

For determining how to split a given bundle, in the one example, the system first evaluates the content before the given bundle, and then determines (1) how many sheets are in the preceding bundles, and (2) the grouping of these bundles into offset stacks of those bundles. In the present example, the first two bundles fit within the trimmer capacity, still leaving room for an additional 150 sheets in the offset stack. The system, determines that splitting the zip 14623 bundle by this number means the second bundle requires 225 sheets which is less than trimmer capacity. Since this results in two zip 14623 bundles, the system splits the data into two bundles at a specified boundary. The resulting bundles fit into three offset stacks:

Offset stack 1: 25 (zip 14621 bundle)+75 (zip 14622 bundle)+150 (zip 14623-1 bundle) for 250 sheets.
Offset stack 2: 175 sheets (zip 14623-2 bundle).
Offset stack 3: 175 sheets (zip 14624 bundle)

If there are additional capacity constraints on other finishing devices, the system may determine how to place set dividers for other post-press processes. This further reduces stack depth used in imposition, thus creating a larger number of stacks to be fed in the right order for reconstituting a corresponding original document. In the present example, there are three offset stacks of roughly 250 sheets, and the bundler is configured to bind 125 postcards together. Consequently, the system further marks divisions in the offset stacks to accommodate the bundling equipment, and this results in the following changes to the planned offset stacks:

Offset stack subset 1-1: 25 (zip 14621 bundle)+75 (zip 14622 bundle) for a total of 125 sheets.
Offset stack subset 1-2: slip sheet+150 sheets (zip 14623-1 bundle).
Offset stack subset 2-1: 175 sheets (zip 14623-2 bundle).
Offset stack subset 2-2: slip sheet+25 sheets (zip 14623-2 bundle).
Offset stack subset 3-1: 175 sheets (zip 14624 bundle).
Offset stack subset 3-2: slip sheet+25 sheets (zip 14624 bundle).

Figure 7:
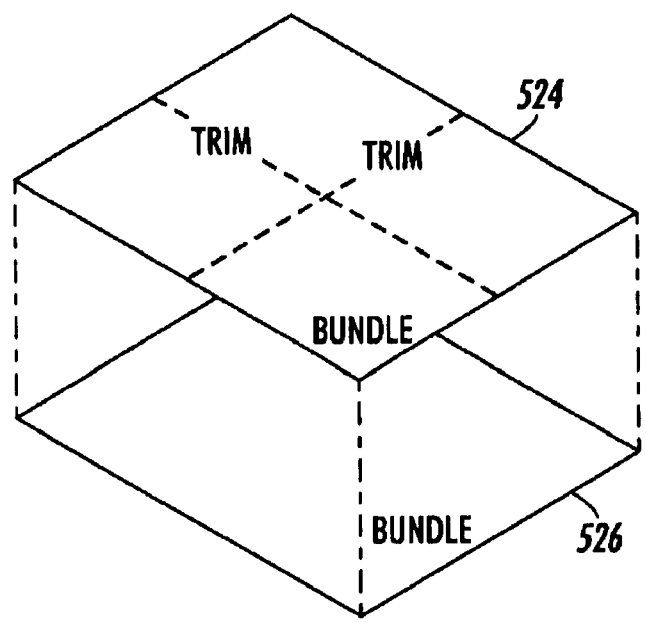
FIG. 7 is an elevational view of two exemplary print media sheets, each of the sheets including finishing instructions.

Once the stack subsets are determined, the system can use cut & stack imposition on the input PDL to create the selected offset stack subsets. The stack depth value will vary through the imposition to flow contiguous input document pages into the offset stack subsets. Although the present example contemplates that these subsets are trimmed, folded and tabbed together as a single offset stack, the subsets are separated during bundling based on the offset stack subset slip sheets. The slip sheets can contain information regarding how the stack subsets should be fed into the final finishing device to reconstitute the original input document order. If these instructions are followed, the record order in the resulting bundles will match the record order in the input file. Additionally, as shown by the example of FIG. 7, the slip sheets can be provided with instructions for use in performing one of several types of finishing operations.

When an input file is imposed in the manner described above, not only can all finishing operations be started one stacker load at a time (as with current practices), but each of the offset stacks subsets can wind it's way through other finishing processes without waiting for either the entire offset stack or the entire stacker output. This allows increased parallelism in producing the job, which is a substantial advantage when printing indefinite length jobs.

It should be recognized that the above-disclosed embodiments permit, among other things,
(1) dynamic adjustment of imposition parameters during the imposition process,
(2) use of finishing device capabilities to find optimal imposition parameters,
(3) awareness of document content (beyond specific job records) to drive imposition parameters,
(4) employment of rules, in conjunction with information about finishing devices and document content information, to dynamically adjust imposition parameters,
(5) automatic modification of imposition execution to explicitly aid bindery operators in handling media (offset and inserts at logical production boundaries (beyond sets/records or defined exceptions)), and
(6) boundary differentiation operations (e.g., offset, slip sheet, offset and slip-sheet, and colored slip sheet) based on rules about operations—a type of operation (e.g. trimming) can be associated with a specific type of boundary demarcation (e.g. offsetting).

Based on the above description, the following features of the first aspect of the disclosed embodiments should now be apparent:

First and second print output stacks may be selectively printed in multiple-up format. As required, both the first and second print output stacks may be printed in multiple-up format.

A print media sheet may be inserted between the first and second print output stacks. The print media sheet may be provided with image related information for use in finishing the second print output stack with an offline finishing device, and the print media sheet may be provided with human readable instruction for use in finishing the second print output stack at the offline finishing device.

A first print media sheet may be provided with a set of image related information for indicating how the first print output stack is to finished at a finishing device, and a second print media sheet may be positioned on top of the first print output stack.

In one example of the first aspect, the first and second print output stacks may be finished as a single print output stack at a first offline finishing device, and at least one of the first and second print output stacks may be finished at a second offline finishing device.

In another example of the first aspect, a trimming apparatus is provided and at least one of a set of pages corresponding with the first print output stack and a set of pages corresponding with the second print output stack is trimmed to obtain prints in a single-up format.

In yet another example of the first aspect, the first print output stack is separated from the second print output stack by way of offsetting. In one instance, the second print output stack includes a first portion and a second portion with a print media sheet inserted between the first and second portions. In another instance, the print media sheet comprises a first print media sheet and a second print media sheet is output on top of the first print output stack.

Based on the above description, the following features of the second aspect of the disclosed embodiments should now be apparent:

A slip sheet may be inserted between a first section and a second section, and the slip sheet may be provided with image information for use in finishing at least one of the first and second sections.

In one example of the second aspect, the first and second sections are output as a single stack. In turn a first type of finishing operation may be performed on at least one of the first and second sections, and a second type of finishing operation may be performed on the single stack comprising both the first and second sections.

In another example of the second aspect, each one of the first and second sections may be trimmed with a trimming apparatus to obtain prints in the single-up format.

In yet another example of the second aspect, the first section may be separated from the second section by offsetting.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of preparing one or more print jobs for finishing:
   (A) providing an output related attribute for at least one offline finishing device, the output related attribute of the at least one offline finishing device corresponding with a first print output stack height;
   (B) dividing a portion of the one or more print jobs into a first set of pages with each page of the first set of pages being in a single-up format and a second set of pages with each page of the second set of pages being in the single-up format, wherein the first set of pages corresponds with a first print output stack having a second stack height and the second set of pages corresponds with a second print output stack having a third stack height;
   (C) providing a printing instruction for causing at least one of the first and second sets of pages to be printed in a multiple up format when either one of the second print output stack height and the third print output stack height is greater than the first print output stack height or the sum of the second print output stack height and the third print output stack height is greater than the first print output stack height; and
   (D) printing the first and second sets of pages with the printing instruction, wherein, (1) during said printing, the at least one of the first print output stack and the second print output stack is printed in multiple-up format, and (2) neither the second print output stack height nor the third print output stack height is greater than the first print output stack height.

2. The method of claim 1, in which only one of the second print output stack height and the third print output stack height is greater than the first print output stack height, wherein, said (D) includes printing just one of the first print output stack and the second print output stack in multiple-up format.

3. The method of claim 1, in which the sum of the second print output stack height and the third print output stack height is greater than the first print output stack height, wherein said (D) includes printing both of the first print output stack and the second print output stack in multiple-up format.

4. The method of claim 1, in which the at least one offline finishing device includes a trimming apparatus, further comprising:
   (E) trimming the at least one of the first and second sets of pages with the trimming apparatus to obtain prints in the single-up format.

5. The method of claim 1, in which the first print output stack is output on top of the second print output stack, further comprising:
   (E) pursuant to said printing of (D), offsetting the first print output stack relative to the second print output stack.

6. The method of claim 5, in which the second print output stack includes a first portion and a second portion, further comprising:
   (F) inserting a print media sheet between the first portion and the second portions.

7. The method of claim 6, in which the print media sheet comprises a first print media sheet, further comprising:
   (G) causing a second print media sheet to be output on top of the first print output stack.

* * * * *